United States Patent [19]

Byrne et al.

[11] Patent Number: 4,943,760
[45] Date of Patent: Jul. 24, 1990

[54] CONTROL SYSTEMS FOR VARIABLE RELUCTANCE ELECTRICAL MACHINES

[75] Inventors: John V. Byrne, Dalkey; Francis McMullin, Ennis; Francis Devitt, Glasnevin; Jeremiah O'Dwyer, Naas; John Murphy, Bishopstown; Michael Egan, Wilton; Michael Brosnan, Ennis; James Lawton, Midleton, all of Ireland

[73] Assignee: Kollmorgen Corporation, Simsbury, Conn.

[21] Appl. No.: 266,482

[22] Filed: Nov. 2, 1988

Related U.S. Application Data

[63] Continuation of Ser. No. 788,856, Oct. 18, 1985, abandoned.

[30] Foreign Application Priority Data

| Oct. 19, 1984 [IE] | Ireland | 2697/84 |
| Oct. 19, 1984 [IE] | Ireland | 2698/84 |
| Oct. 19, 1984 [IE] | Ireland | 2699/84 |
| Apr. 16, 1985 [IE] | Ireland | 957/85 |

[51] Int. Cl.$^5$ .............................. H02P 5/40
[52] U.S. Cl. ............................... 318/701
[58] Field of Search ........................ 318/261

[56] References Cited

U.S. PATENT DOCUMENTS

| 3,062,979 | 11/1962 | Jarret et al. |
| 3,171,049 | 2/1965 | Jarret et al. |
| 3,305,717 | 2/1967 | Weiss |
| 3,521,098 | 7/1970 | Jesse |
| 3,743,906 | 7/1973 | Torok |
| 3,783,358 | 1/1974 | Krauer |
| 3,909,693 | 9/1930 | Yorhitake et al. |
| 3,919,608 | 11/1975 | Usami et al. |
| 3,956,678 | 5/1976 | Byrne et al. |
| 4,093,905 | 6/1978 | von Braun |
| 4,121,145 | 10/1978 | Talmadge |
| 4,124,194 | 7/1980 | Horning |
| 4,143,308 | 3/1979 | Deplante et al. |

(List continued on next page.)

FOREIGN PATENT DOCUMENTS

| 0096390 | 12/1983 | European Pat. Off. |
| 1638401A | 5/1971 | Fed. Rep. of Germany |
| WOA179/01-132 | 12/1979 | PCT Int'l Appl. |
| WO83/0009-57 | 3/1983 | PCT Int'l Appl. |
| 1175512 | 12/1969 | United Kingdom |
| 1240979 | 7/1971 | United Kingdom |
| 1321110 | 6/1973 | United Kingdom |
| 1329596 | 9/1973 | United Kingdom |
| 1335935 | 10/1973 | United Kingdom |
| 1358941 | 7/1974 | United Kingdom |
| 1525384 | 9/1978 | United Kingdom |
| 1579121 | 11/1980 | United Kingdom |
| 1591346 | 7/1981 | United Kingdom |

(List continued on next page.)

OTHER PUBLICATIONS

IEE Conference Publication, No. 136, 1976; J. V. Byrne et al; "Characteristics of saturable stepper and reluctance motors".

(List continued on next page.)

Primary Examiner—David Smith, Jr.
Attorney, Agent, or Firm—Morgan & Finnegan

[57] ABSTRACT

In a control system for a reluctance motor driving a load, the output of a reference waveform generator is applied to a power converter through a current controller. The output of the generator is determined by rotor position, as detected by a sensor. The generator establishes a relative magnitude for motor phase current for every position of the rotor during the period of energization of a motor phase. A further control input may determine the absolute magnitude of the motor phase current, subject to the waveform pattern established by the generator. The reference waveforms may be sinusoidal. A method of determining the configuration of suitable reference waveforms for a given motor involves monitoring selected parameters of motor operation while controlling other such parameter in a test procedure.

7 Claims, 7 Drawing Sheets

U.S. PATENT DOCUMENTS

| | | |
|---|---|---|
| 4,145,644 | 3/1979 | Liu . |
| 4,223,261 | 9/1986 | White . |
| 4,284,940 | 8/1981 | Welburn . |
| 4,306,181 | 12/1981 | Welburn . |
| 4,368,411 | 1/1983 | Kidd . |
| 4,491,778 | 1/1985 | Knox et al. . |
| 4,501,980 | 2/1985 | Welburn . |
| 4,513,362 | 4/1985 | Aizawa . |

FOREIGN PATENT DOCUMENTS

| | | |
|---|---|---|
| 1597486 | 9/1981 | United Kingdom . |
| 2105536 | 3/1983 | United Kingdom . |
| 2105933A | 3/1983 | United Kingdom . |
| 2107492A | 4/1983 | United Kingdom . |

OTHER PUBLICATIONS

IEE Proceedings, Vo. 131, No. 2, Part B, Mar., 1984, pp. 51–60, Old Woking, Surrey, GB; P. H. Chappel et al.; Microprocessor control of a variable reluctance motor.

Electric Machinery—Third Edition; Fitzgerald et al.; McGraw-Hill, 1961 pp. 506–509.

Electrical Machines and their Applications, Second Edition; Hindmarsh; Pergamon 1970, pp. 536–539.

IEE International Conference on Power Electronics and Variable Speed Drives, May 1984; Ray, Lawrenson et al: Industrial Switched Reluctance Drives—Concepts and Performance.

Motor-Con, Oct. 1985; Torrey and Lang: Progress on the Development of a 60-kw Variable-reluctance Motor Drive for Electric Vehicle Propulsion International Conference on Electrical Machines, Athens, Sep. 1980; Lawrenson et al: Switched Reluctance Motors for Traction Drives.

Motor-Con, Oct. 1985; Byrne et al: A High Performance Variable Reluctance Drive: A New Brushless Servo.

Proc. IEE Conference on Variable Speed Drives, Sep. 1979; Bolton and Pedder: Low-Cost, Reluctance Drive System for Low Power, Low Speed Application.

Power Division of the Institution of Electrical Engineers, Second International Conference on Small and Special Electrical Machines, Sep. 1981; Chatratana, Bolton and Pedder: "Investigation into Small Single-phase Switched Reluctance Motors".

4,943,760

CONTROL SYSTEMS FOR VARIABLE RELUCTANCE ELECTRICAL MACHINES

This is a continuation of co-pending application Ser. No. 788,856 filed 10/18/85, now abandoned.

BACKGROUND OF THE INVENTION

1. Field of the Invention

The present invention relates to control systems for variable reluctance electrical motors and in particular to control systems for drive systems such as those forming the subjects of our co-pending patent application Ser. Nos. 789,038 and 789,095, respectively "Variable Speed Variable Reluctance Electric Machines" and "Servomotor Control Systems" now U.S. Pat. Nos. 4,670,696 and 4,661,756. The drive systems described in said co-pending Applications incorporate a variety of control features for association with variable reluctance electrical motors. These control features are also useful in themselves in selfcontained control systems not necessarily incorporating a variable reluctance electrical motor, but applicable to a variety of such motors.

The invention also relates to test and set-up methods for drive systems for variable reluctance motors and in particular to such methods when applied to drive systems in accordance with the features disclosed in our co-pending patent application Ser. No. 789,038 entitled "Variable Speed Variable Reluctance Electrical Machines" and to drive systems incorporating control systems in accordance with the present invention.

2. Brief Summary of the Invention

According to a first aspect of the invention, there is provided a control system for a variable reluctance electrical motor, comprising means for connecting a voltage source or sources across driving member windings of a said motor, said windings being connectible across said source or a said source in a predetermined sequence and for a predetermined increment of motor driven member displacement, and means for regulating the instantaneous magnitude of the current in a driving member winding when connected to said source or a said source, said current-regulating means being responsive to a driven member position dependent signal of driven-member position-sensing means of or associated with said motor to regulate said current magnitude so that the instantaneous value of said current set by said regulating means at any position of the driven member within said increment of driven member displacement during which the winding is connectible to said source or a said source relative to its any value at any other said position is substantially determined by the instantaneous position of the driven member.

The control system according to the invention may comprise means for connecting a voltage source or sources across stator pole windings of a said motor, said windings being connectible across said source or a said source in a predetermined sequence during rotation of the rotor of the motor and each stator pole winding being thus connectible for a predetermined angular increment of rotor rotation, and means for regulating the instantaneous magnitude of the current in a stator winding when connected to said source or a said source, said currentregulating means being responsive to a rotor position-dependent signal of rotor position-sensing means associated with said motor to regulate said current magnitude so that the instantaneous value of said current set by said regulating means at any angular position of the rotor within said increment of rotor rotation during which the winding is connectible to said source or a said source relative to its value at any other said angular position is substantially determined by the instantaneous angular position of the rotor.

The current-regulating means may be responsive to said rotorposition dependent signal to regulate said current magnitude so that successive instantaneous values of said current during an initial portion of said angular increment of rotor rotation during which the winding is connectible to said source or a said source increase progressively with progressive rotation of the rotor and successive instantaneous values of said current during a terminal portion of said angular increment decrease progressively with said progressive rotation.

The current-regulating means may be responsive to said rotorposition dependent signal to regulate said current magnitude so that the rate at which successive instantaneous values of said current decrease during said terminal portion of said angular increment of rotor rotation is substantially the same as the rate of increase of successive instantaneous current values during said initial portion and the succession of instantaneous current values over said angular increment of rotor rotation substantially defines a substantially symmetrical current waveshape extending over said angular increment.

The current-regulating means may also be responsive to said rotor-position dependent signal to regulate said current magnitude so that successive instantaneous values of said current during said initial portion of said angular increment of rotor rotation substantially define the rising current region of a substantially sinusoidal current halfwave and successive instantaneous values of said current during said terminal portion of said angular increment substantially define the falling current region of a substantially sinusoidal current halfwave An intermediate portion of said angular increment of rotor rotation may optionally be interposed between said initial and terminal portions and the current magnitude may remain substantially constant during said intermediate portion of said angular increment of rotor rotation. In an especially preferred embodiment of the control system according to the invention, said current-regulating means is responsive to said rotor-position dependent signal to regulate said current magnitude so that said instantaneous current values during said angular increment of rotor rotation substantially define a substantially sinusoidal halfwave.

The control system according to the invention may further comprise means for producing a signal, the value of which is indicative of a desired parameter of motor operation, said current-regulating means also being responsive to said parameter-indicative signal to regulate said stator winding current so that the absolute magnitude of said current at every angular position of the rotor within said angular increment of rotor rotation during which the winding is connectible to said voltage source or a said voltage source is substantially determined by the value of said Parameter-indicative signal.

Control systems according to the invention applied to reluctance motor drives permit exceptionally quiet operation of the motor to be achieved, which represents a significant advantage in the commercial and industrial application of these motors. As noted in our co-pending Applications, reluctance motor power drives have always been noteworthy for the amount of noise they generate. By cutting down on their noise, the acceptability of reluctance motors to users is accordingly enhanced.

By controlling the relative instantaneous magnitude of the current input to typically each pair of stator phase windings of a machine, as they are sequentially energised in accordance with the angular position of the rotor within the appropriate angular segment of rotor rotation, the torque developed by each phase of the machine during its period of energisation may be closely controlled so that the detrimental effects of rapid torque rise at the start of pole overlap and torque ripple where the torques of successive phases overlap may be minimised. Regulation of current in the outgoing phase is related to the rate of current rise in the incoming phase to give a substantially constant nett machine torque output. This smooth transition may be achieved with substantially any construction of the machine poles, although as set out in a co-pending patent application, pole shaping is also of benefit in implementing noise-free and vibration-free operation of reluctance motors. In the particularly favoured constructions of the present invention as disclosed in the present patent Application, smooth sinusoidal variations in phase currents are employed with especially satisfactory results in regard to noise and vibration. The high level of disturbing noise and vibration so characteristic of many prior art reluctance motor drives may be largely eliminated by use of the control system of the invention, both with and without complementary pole shaping techniques.

Quiet operation is especially associated with energisation of the phases by means of sinusoidal current waveforms, but is in no way limited to this embodiment of the control system of the invention. Ramped wave forms may also be employed, the initial and terminal rates of current rise and fall being selected by methods such as those forming the subject of a further aspect of the present invention, hereinafter described. In addition, the entire waveform profile may be tailored to suit each individual motor phase to bring about smooth transfer of torque between phases during operation in accordance with said methods and such tailoring may be incorporated in the production process for the control systems for the motors, so that each motor's performance may be optimised in regard to both torque smoothness and quietness of operation.

Thus in order to improve machine performance in terms of noise and vibration, motor torque may be controlled by current regulation, as also described in said co-pending Applications, to minimise the detrimental effects of rapid torque rise at the start of pole overlap and torque ripple where the torques of successive phases overlap. In particular, current in an outgoing phase may be regulated so that the torque of that phase is reduced at a rate such that the torque developed by the outgoing phase taken together with the torque being developed by the incoming phase together amounts to a substantially constant net machine torque output.

It is a further object of the present invention to provide a method for enabling appropriate values of phase winding or exciting current to be established for each disposition of the rotor or driven member of a variable reluctance motor relative to the driving member or stator at least during a transition between phases, this disposition being typically an angular orientation of a rotary driven member or rotor.

According therefore to a further aspect of the invention, there is provided a method of establishing relationships between a plurality of parameters of operation of a saturable variable reluctance electrical machine, said electrical machine comprising a stationary or driving member having a plurality of salient driving poles, a magnetising winding for each driving pole, a movable or driven member having a plurality of salient driven poles, the number of driven poles being less than the number of driving poles, the airgap between each driving pole and a driven pole positioned in alignment therewith being small relative to the dimensions of the poles transverse to said airgap so that in operation of the machine magnetic saturation occurs in the region of the mechanically variable interface or overlap between the driving and driven poles, and the extents and dispositions of the driven poles being related to those of the driving poles so that in operation of the machine the force-producing increment of driven member displacement resulting from the mechanical interface or overlap of each driven pole with a driving pole overlaps the force-producing increment of driven member displacement resulting from the overlap of another driven pole with a further driving pole. said parameters including an exciting current for at least one said magnetising winding, the disposition of the movable or driven member relative to the stationary, or driving member, and the force exerted on the driven member in the presence of a said exciting current in one or more of said magnetising windings, wherein a measured level of exciting current is applied to one of said magnetising windings while the position of the driven member is maintained fixed relative to the driving member, and the force exerted on the driven member during the application of said exciting current to said winding is determined.

In the application of the method to a rotary machine comprising a stator having a plurality of salient stator poles, a magnetising winding for each stator pole, a rotor having a plurality of salient rotor poles, the number of rotor poles being less than the number of stator poles, the radial airgap between each stator pole and a rotor pole positioned in alignment therewith being small relative to the dimensions of the poles transverse to said airgap so that in operation of the machine magnetic saturation occurs in the region of the mechanically variable interface or overlap between the stator and rotor poles, and the arcuate extents and dispositions of the rotor poles being related to those of the stator poles so that in operation of the machine the torque-producing angular increment of rotor rotation resulting from the mechanical interface or overlap of each rotor pole with a stator pole overlaps the torque producing angular increment of rotor rotation resulting from the overlap of another rotor pole with a further stator pole, said parameters include an exciting current for at least one said magnetising winding, the disposition of the rotor relative to the stator, and the torque exerted on the rotor in the presence of a said exciting current in one or more of said magnetising windings, a measured level of exciting current is applied to one of said magnetising windings while the position of the rotor is maintained fixed relative to the stator, and the torque exerted on the rotor during the application of said exciting current to said winding is determined.

In order to derive a further useful relationship between said parameters, an exciting current may also be applied to a further said magnetising winding and this further current may be varied in magnitude until said force or torque exerted on the driven member or rotor has a predetermined value.

Apparatus for use in the method of the invention preferably comprises means for applying a respective exciting current to one or more of said magnetising windings, means for controlling the magnitude of the or each said exciting current, means for maintaining the driven member or rotor in a predetermined position relative to the driving member or stator, and means for measuring the force exerted on the driven member or the torque exerted on the rotor when at least one of the magnetising windings is energised.

Accordingly, the torque contribution of a particular stator phase may be measured in a static test in which the phase winding is energised with DC current. However interaction between phases when two or more windings are energised simultaneously means that each individual phase to phase transition may require to be experimentally determined with both phases energised. Accordingly in such testing, one phase current waveform may be arbitrarily selected and the other phase current variation then tailored to give torque smoothness, involving a static test according to the present invention in which the rotor is attached to a torque-measuring device and locked in a series of positions in the transition region. In each rotor position an appropriate value of the selected current is established in one phase as a DC current and the DC current in the other phase is adjusted to give the required constant torque reading. Repetition of this procedure at intervals over the torque overlap region defines the current waveforms required for torque smoothness. These experimentally-determined current waveforms are then approximated by digitised wave-forms with step variations in current at 0.5° intervals to give the values needed, for example, for an EPROM based system, or they are incorporated in an analogue construction of the current-regulating means.

BRIEF DESCRIPTION OF THE DRAWINGS

Embodiments of control systems incorporating the principles of the present invention are now described together with the method of the second aspect of the invention, having regard to the accompanying drawings, in which.

DETAILED DESCRIPTION OF THE DRAWINGS

Figure 1:
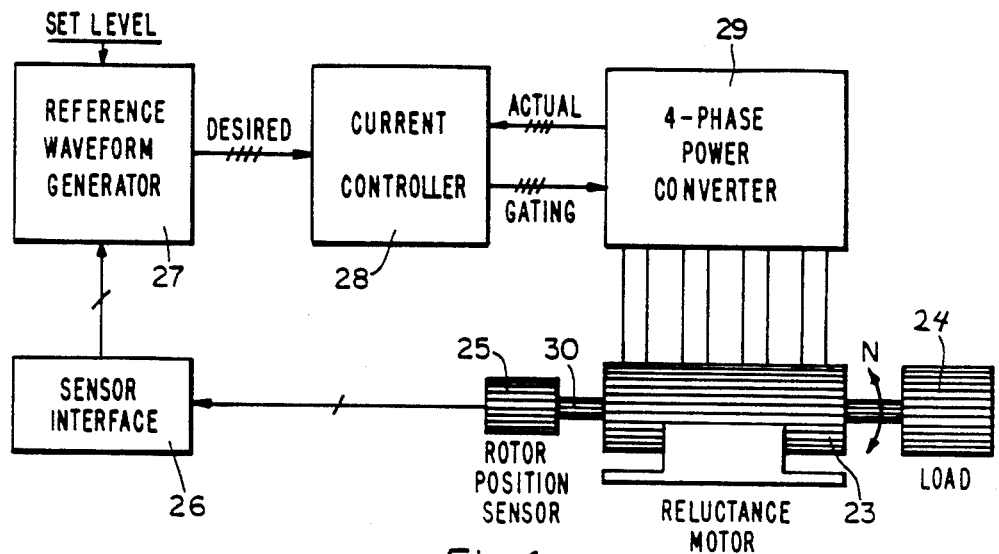
FIG. 1 is a block diagram of a variable reluctance motor drive system according to the invention.

A variable reluctance motor drive system under torque control and embodying the principles of the present invention is shown in FIG. 1. As depicted in this Figure, the system has only an inner torque control loop, which is relevant to the present discussion, but in a typical practical construction, an outer speed control loop is also provided, the torque then being adjusted or controlled to meet a set speed signal in operation of the system. A four-phase reluctance motor 23 drives a load 24 and has a rotor position sensor 25 associated with its shaft 30. The sensor may be for example an encoder generating one or more streams of pulses which are electronicallay processed to provide shaft position information at a succession of angular intervals. Appropriate logic is employed to permit determination of the direction of rotation and a zero marker is also provided. A reference waveform generator 27 uses position information from the sensor 25. modified as required by sensor interface 26, to provide as an output, a signal indicative of the value of current required in each phase for each angular position of the shaft to achieve a desired shape of phase torque. The generator 27 has a further "set level" input adjustable by a controller or monitoring means, for determining the actual value of the torque to be generated, subject to the shape constraints also called for by the generator The output signal from the generator 27, of a value determined by the combination of rotor position signal and set level input, is applied to a current controller 28, which provides an output signal for each of the four phases of the motor in the form of a reference current waveshape. These reference waveshapes then provide gating signals or inputs to a power converter 29 in which the actual phase currents of the motor are forced to track the reference current waveforms. For this purpose a signal indicative of the actual current in each phase is fed back to the current controller, so that the gating signal forwarded to the converter from the controller 28 serves to produce the required phase current.

The waveform generator 27 and the current controller 28 together form current magnitude regulating means by which the relative instantaneous value of the exciting current in each stator winding at every rotor position can be controlled so that the energising current will have a waveshape suitable for achieving the phase torques desired during operation of the motor for smooth torque transitions between phases and minimisation of "hammer-blow". According to various constructions of the system of the invention, specific waveshapes may be produced by appropriate analogue means. In one such embodiment, the output of the sensor may be modified to provide a sinewave, the instantaneous magnitude of which at each rotor position is used directly to establish the appropriate relative value for the winding current. The current regulating means formed by. generator 27 and controller 28 is further responsive to the "set level" signal to establish an absolute magnitude for the current at each rotor position, while the relative value of the current at that position compared with its value at any and every other position is determined by the rotor position as signalled by the sensor.

Figure 2:
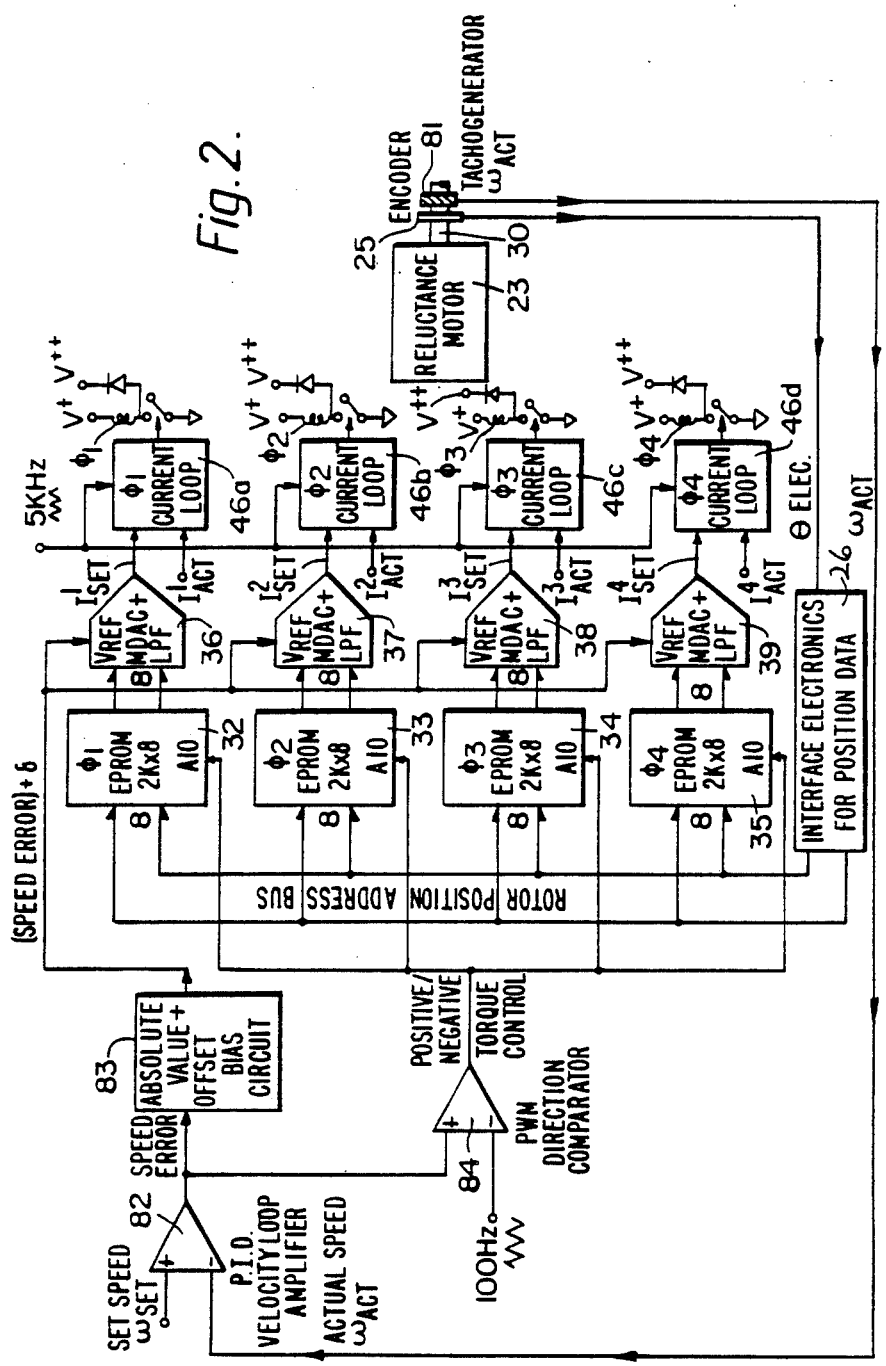
FIG. 2 is a schematic diagram of a control system for a variable reluctance motor.

A comprehensive block diagram showing a servo-controller for achieving high performance closed-loop speed control of a saturable variable reluctance motor and enlarging on the current-magnitude regulating portion of the drive system of FIG. 1 is shown in FIG. 2.

FIG. 2 is a block diagram of a waveform generator 27 for the system of FIG. 1, incorporating EPROMs 32 to 35. The EPROMs hold digitised magnitudes for reference current waveshapes at each incremental rotor angle. The signals from the encoder 25 are electronically processed by interface 26 to provide 0.5° shaft position information. This information addresses the EPROMs 32 to 35 so that the correct phase current values corresponding to each 0.5° shaft position appear at the EPROM outputs. Each phase current waveform for the four-phase motor 23 of FIG. 1 is periodic over each 60° sector of shaft rotation so that the current waveform for each phase is stored in 120 locations of the relevant one of the memories 32 to 35 for that phase and is accessed six times during each shaft revolution. This is achieved by means of a modulo-120 pure binary synchronous up/down counter interposed between processor or interface 26 and the EPROMs. The resulting digital position information is processed to form the address bus of the four EPROMs, in the arrangement shown in FIG. 2.

FIG. 2 also shows means for closed-loop speed control of motor 23, which is not however directly pertinent in detail to the present invention. A speed error voltage from a tachogenerator 81 provides an actual speed signal, which is compared with a set speed signal at amplifier 82. The sign of the resulting speed error is detected by comparator 84 to enable selection of the appropriate forward or reverse waveform information from the EPROMs 32 to 35, while bias is applied to the speed error signal by circuit 83 to yield a torque demand signal $V_{REF}$.

In an alternative arrangement, two EPROMs may suffice for storage of reference current waveform data for four phases, in conjunction with downstream digital to analog converters and demultiplexers, so that four output reference waveforms may be generated. The storage space of the memories may also be sufficient to allow several sets of waveforms to be held, each waveform applying to a different speed range of the motor, and the system may allow selection of the appropriate waveform in dependence on motor speed. The system is operable either from an absolute position encoder or from an incremental optical encoder, a resolver or any other sensor capable of providing the necessary degree of identification of rotor angular position.

With an optical encoder, a larger number of pulses per revolution may also be derived so that resolution down to 0.25° may be achieved.

The information contained in these EPROMs consists of digitised current waveforms, idealised examples of which are shown in subsequent Figures. The waveforms for forward and reverse torque output are stored in different memory banks and the sign of the generated torque is under control of a particular address bit of the EPROMs responsive to the input from comparator 84. The origin for the position information is suitably the point of maximum reluctance of phase one and the waveshapes are stored for one complete electrical cycle, which corresponds to 60° mechanical for a six-pole rotor in the four-phase machine. The interface electronics reset the address bus to the origin after every 60° of shaft rotation. Thus, as the shaft rotates, the EPROM data outputs produce the digitised current waveshapes necessary to generate positive or negative torque in the motor. The retrieved waveforms from the EPROMs feed multiplying digital to analog convertors (MDACs) 36 to 39 and the outputs of these are analog forms of the phase current reference waveforms. These outputs form the final outputs of the waveform generator, each phase having an individual output.

In the final stage therefore, the digital current waveshapes are reproduced at high current levels in the motor phases through the use of the MDACs 36 to 39 and conventional Proportional/Integral/Differential (PID) current loops 46a to 46d. The digital waveforms are first converted to analogue form in the MDACs where the reference voltage, $V_{REF}$, representing a torque demand signal, is used to control the overall amplitude of the phase currents The output of each MDAC is the product of the appropriate digital current waveshape from the respective EPROM, this determining the relative magnitude of each phase current during the period of energisation of the phase, and the analogue reference voltage, $V_{REF}$, which is common to all four phases and establishes the absolute magnitude of the energising currents in the phase windings. These MDAC voltages then become the set or target currents in the four PID current loops which use conventional, FET input, operational amplifiers. These current loops act to force the actual Phase currents to track the set currents by controlling the switching times of the power devices in the power converter driving the motor. The switching frequency of these devices is kept constant at 5 kHz by using a synchronizing triangular wave at this frequency, although higher frequencies may also be used.

This system has the capability of producing substantially any desired torque output from the variable reluctance motor compatible with its static torque characteristics. In addition, the magnitude of the torque output may be electronically controlled by varying the analogue reference voltage, $V_{REF}$, and its direction may be changed simply by switching EPROM address banks via the appropriate address bit.

Since the EPROMs are capable of storing substantially any desired reference waveform, various strategies for overcoming the problem of the initial rapid torque rise at the commencement of pole overlap and the torque ripple arising from switching between the roll-off portion of a phase coming to an end and the rising torque portion of a phase beginning overlap may be adopted, but in a preferred strategy sinusoidal phase currents are applied to the phase windings and the static torque versus rotor angle characteristics of the motor are modified to a substantially sinusoidal form by rotor pole skewing. This strategy is also further explained in our co-pending patent application Ser. No. 789,039 entitled "Variable Speed Variable Reluctance Electrical Machines" in regard to FIG. 18 of that application.

In further amplification of this strategy, open-loop torque smoothness in the reluctance motor drive system is in general achieved by shaping the static-torque/rotor angle characteristics of the motor and selecting and synthesizing appropriate phase current waveshapes to produce constant torque independent of rotor position. In the present particularisation of this strategy, sinusoidal currents and sinusoidal static torque characteristics are favoured. The use of EPROMs in implementing this strategy provides an especially versatile and powerful means of overcoming any non-idealities encountered in the highly non-linear, doubly salient reluctance motor, in that the current waveforms stored in the EPROMs may be of whatever shape is most appropriate for a given motor. As long as there is torque overlap between phases, currents can always be selected to give constant torque output. The required current waveforms may be calculated by computer means either at the design stage or from analysis of actual experimental data. However, the sinusoidal realisation described herein and favoured may in general be implemented without such individual waveshape tailoring, in that nonidealities are found to be of less significance in the case of sinusoids.

In open-loop operation of this strategy, which may be represented by the features of FIG. 2 but without the tachogenerator 81 input, the offset bias circuit 83 and the direction comparator 84, rotor shaft position, $\theta_{elec}$, is again measured using a digital position sensor 25, and this digital position information is processed to form the address bus of the four Erasable Programmable-Read-Only-Memories (EPROM's), one for each phase. The digitized current waveforms for forward and reverse torque output are again stored in different memory banks of the EPROMs and the sign of the generated torque is under control of the most significant address bit $A_{10}$ of the EPROM's. The origin for the position information is the point of maximum reluctance of phase one and the waveshapes are stored for one complete electrical cycle, 0° elec to 360°, which is 60° mechanical for the eight stator pole, six stator pole four-phase machine of FIG. 1. The position interface electronics resets the address bus to the origin after every 60° of shaft rotation. Thus, as the shaft rotates, the EPROM data outputs produce the digitized current waveshapes necessary to generate smooth positive or negative torque in the motor, and the high currents for the motor phases are reproduced in the final stage of the controller, as already described.

This system has the capability of producing smooth torque output from the variable reluctance motor. The magnitude of the torque output may be electronically controlled by varying the analogue reference voltage, $V_{REF}$, and its direction may be changed simply by switching EPROM address banks via $A_{10}$.

Figure 3:
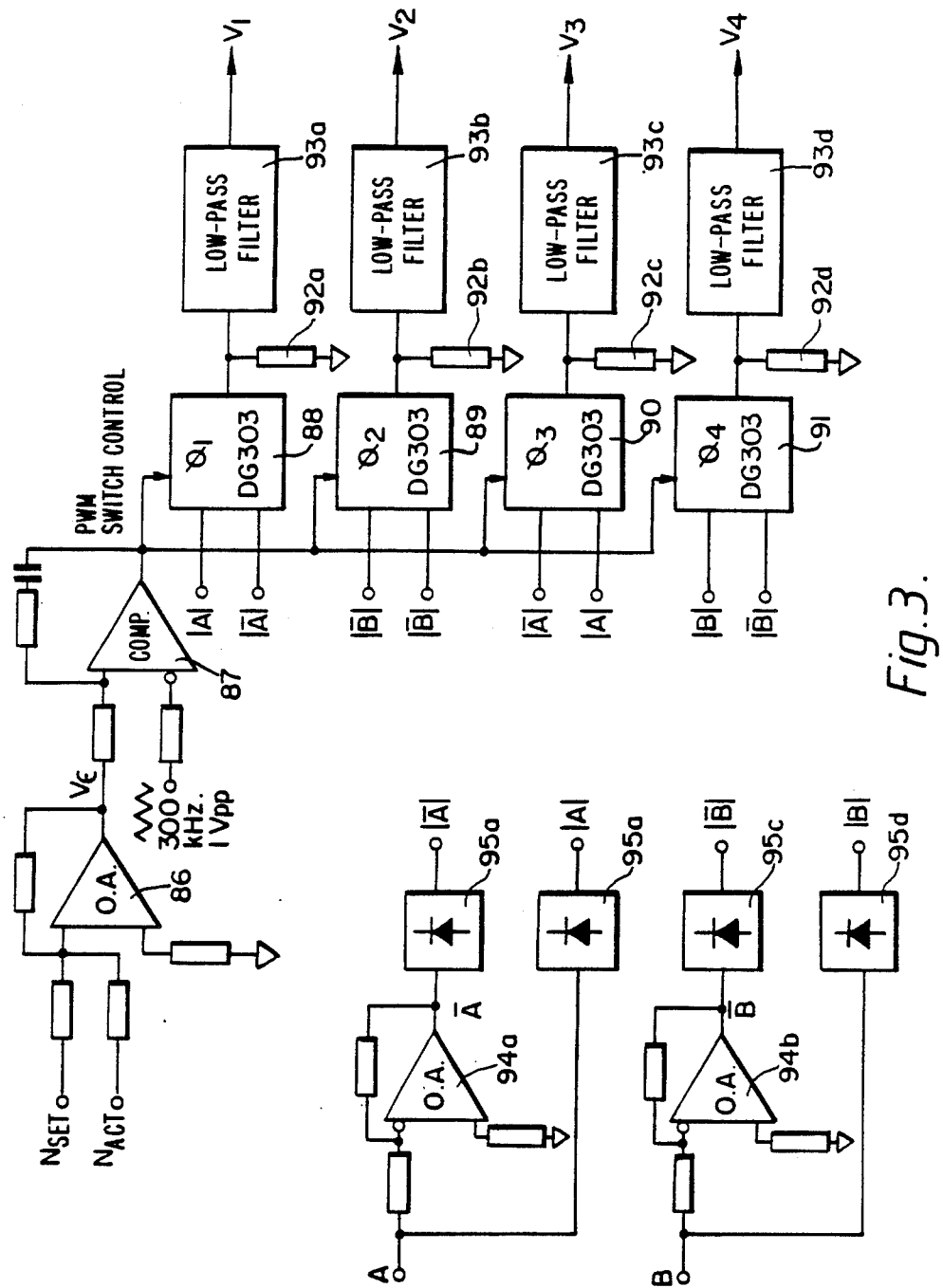
FIG. 3 shows an analogue adaptation of a control system according to the present invention.

In the analogue circuit arrangement shown in FIG. 3, velocity loop error voltage is used to select positive or negative torque, or a combination of small positive and negative torques about zero.

A velocity-loop amplifier 86 compares the set-speed voltage ($N_{set}$) to a voltage proportional to the actual motor speed ($N_{act}$) and multiplies it by a very large gain to produce a velocity loop error voltage as in conventional servosystems. This error voltage is then used to control the torque direction by means of a comparator/analogue switch circuit 87. The velocity loop error voltage, $V_e$, is compared to a very high frequency (300 kHz) low amplitude (1 V pp) triangular waveform. The output of this circuit is either completely high or completely low for inputs greater than 1.0 V, giving either all positive or all negative torque as required. In these cases, the overall motor torque is controlled by an absolute value/offset buffer stage. For $|V_e| < 1.0$ V however, the output of the comparator is a very high frequency PWM signal, the pulse width of which is used to control the switching of four analogue switches 88, 89, 90, 91, for example of a single-pole double-throw variety (DG303, Siliconix (Trade Mark)). The outputs of these analogue switches, which are pulled low via four pull-down resistors, 92a–92d, are thus analogue voltages which are switched at high frequency from reference voltages to ground. These high frequency PWM analogue voltages are filtered by second-order low pass filters 93a–93d, each having an appropriate cutoff frequency, to give the required reference signals $V_1$–$V_4$ as a function of motor shaft position. As the error voltage $V_e$ passes through zero the reference waveforms from this circuit will also transition smoothly from positive to negative torque currents with a combination of small positive or negative torque currents about $V_e = 0$.

The maximum fundamental frequency of the basic reference voltage signals A and B for application to the analogue switches for a six pole machine will be, $$f_{max} = 6 f_{motor}$$

where
$f_{motor}$ = Motor speed in Hz
$f_{max}$ = Frequency of reference currents from transducer.

For a motor speed of 4500 rpm, $f_{max} = 450$ Hz, and hence the cutoff frequency of the low-pass filter must be well above this value. It is important that the design of the low-pass filter take account of this in the present system, since no phase shifting of the input signal can be tolerated. If this were to happen, useless counter-torque current could be synthesized leading to a possibly reduced efficiency of the motor. FIG. 3 also shows inverters 94a and 94b and diodes 95a to 95d by which the sine and cosine waves A and B are transformed into the required absolute value waveforms $|A|, |\overline{A}|, |B|$ and $|\overline{B}|$ to provide inputs to the analogue switches 88–91.

At the outputs from the low-pass filter stage the basic reference current waveforms $V_1$–$V_4$ must be processed so that as the velocity-loop error increases or decreases the demanded current level alters to produce the required torque. This requires, as already described for the earlier embodiment, multiplication of these output reference voltages by the absolute value of the speed error voltage $V_e$, since a reversal of current direction has no effect on the generated torque in a reluctance motor. This may be carried out using only operational amplifiers and comparators. For closed-loop speed control, bias may again be introduced, as in the first embodiment, to improve the low-speed dynamic performance, and the final processed error voltage multiplied by the reference current waveshapes to produce the demanded current levels in the motor.

Figure 4:
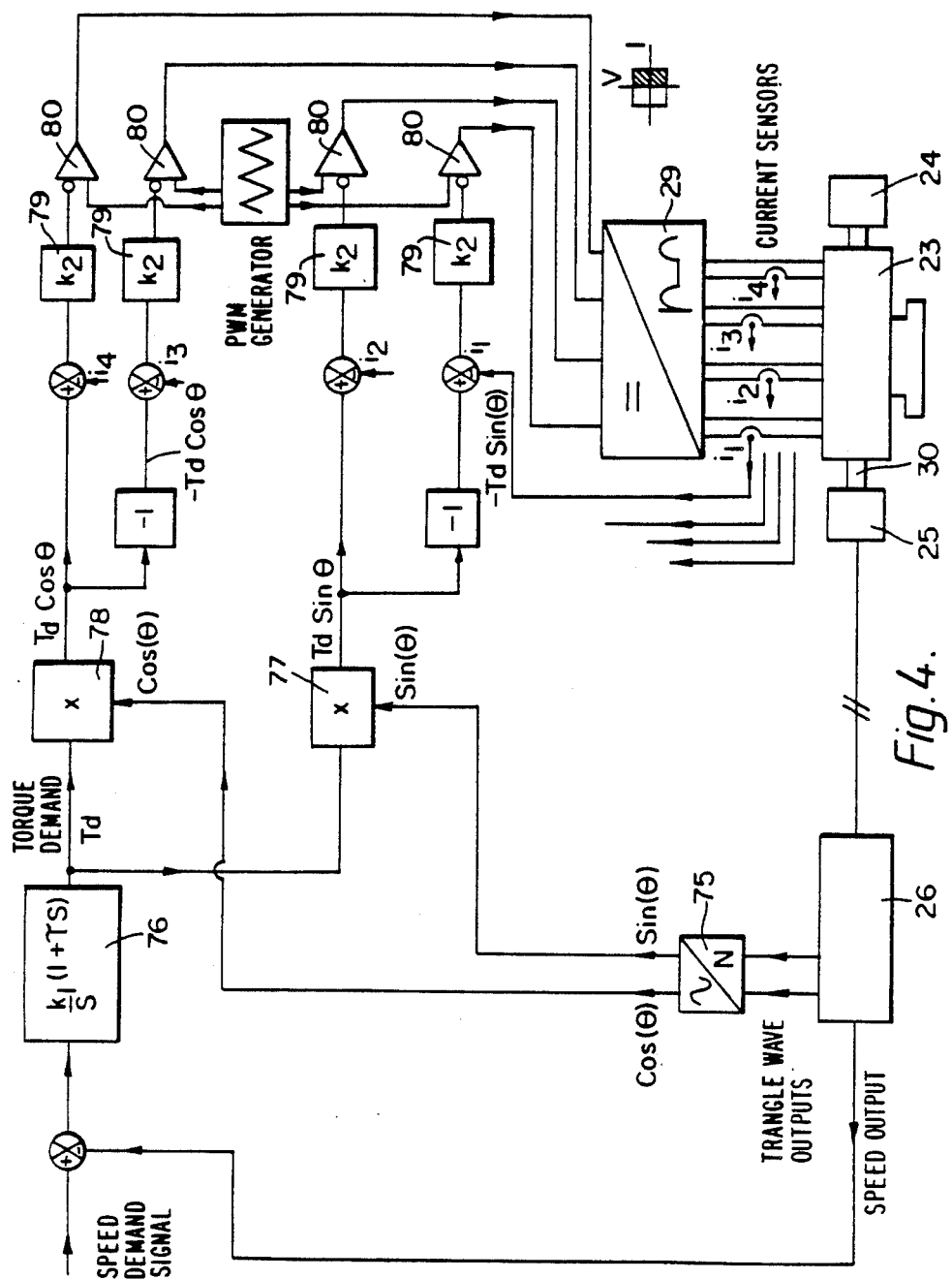
FIG. 4 shows a schematic diagram of a further analogue realisation of a drive system incorporating control features in accordance with the present invention.

FIG. 4 shows in schematic diagrammatic form, an analogue circuit arrangement especially suitable for but not limited to a six rotor pole, eight stator pole motor having skewed poles and a substantially sinusoidal static torque against rotor angle characteristic. Sensor 25 is arranged to have an output which is in the form of two triangular wave-forms in quadrature and cyclic in 60° mechanical. These signals are converted to sinusoidal waveforms by converters 75, giving sine and cosine waves. These sine and cosine waves serve to form correct reference current waveshapes for achieving smooth torque output in this embodiment.

Since positive and negative torque is created in the reluctance motor depending on the rotor position when each phase winding is energised, if a positive half-sinewave is associated with phase 1 for positive torque, then the inverted negative half cosine wave must be associated with phase 2, the inverted negative sine half-wave with phase 3 and the positive cosine half-wave with phase 4. For negative torque, the phase sequence is inverted negative half-sinewave, positive cosine half-wave, positive sine half-wave and inverted negative cosine half-wave. Since only unidirectional currents are required in each phase, the two-quadrant power controller is arranged to respond to current in one direction only, so that its output is one half-cycle for each of the full waveforms applied to it, and each phase is energised in turn by half waves of the same polarity.

In FIG. 4, a further output from the sensor interface 26 provides a speed output signal which is associated with a speed demand signal to provide an input to a speed controller 76, the output of which is a torque demand signal. This torque demand signal is applied along with one of the sine or cosine waves generated by the converters 75 to a respective analogue multiplier 77 or 78. The output of multiplier 77 is then a sine wave and that of multiplier 78 a cosine wave, the relative instantaneous magnitudes of these output signals following the sine and cosine waves determined by the converters 75 while their absolute magnitudes are set by the torque demand signal. In the case of regular sinewaves used in the present construction of control systems, this torque demand signal may be the peak value of the wave, which then determines the current level at all other points along the waves, but this is not necessarily the case for other waveforms. Following the analogue multipliers, the sine wave and cosine wave are each paralleled by an inverted sine and cosine wave respectively and these four signals are applied to current controllers 79, in which current feedback signals from the phase windings are associated with the sine and cosine signals to provide actual current demand signals for the power converter 29. The final output signals from the current controllers 79 are applied to comparators 80, which also have high frequency inputs for pulse width modulation in known manner. The PWM input is modulated in each case by the set level signal from the current controller 79 and the resulting outputs provide said current demand signals for the two-quadrant power converter 29.

Figure 5:
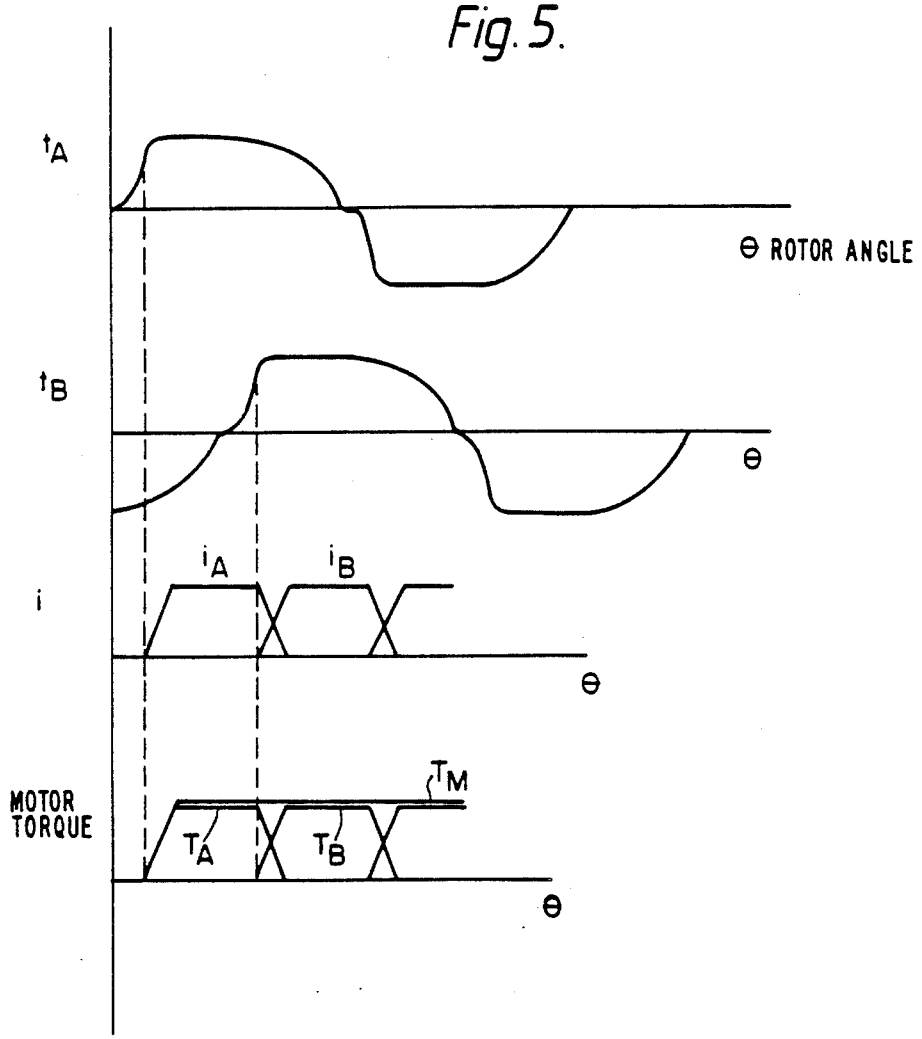
FIG. 5 is a diagram showing static torque against rotor angle for two phases of a four-phase variable reluctance motor, using ramped or trapezoidal current waveforms for producing smooth transitions between individual phase torques, together with the resultant motor torques in operation.

A particular strategy using ramped current magnitudes to overcome the problem of the initial rapid torque rise at the commencement of overlap and the torque ripple arising from switching between the roll-off portion of a phase coming to an end and the rising torque portion of a phase beginning pole overlap is illustrated in FIG. 5. The drawing is schematic only and is not intended to represent any particular machine characteristic. Static phase torques (t) are shown against rotor angle for phases A and B, together with current waveforms (i) to be applied to these phases to yield a relatively smooth motor torque. The strategy involves switching current into a phase (as shown for phase A) at a controlled rate rising linearly but commencing only after the initial sharp static torque rise so that the torque (T) produced by this phase in operation of the motor rises at a controlled rate corresponding to the rate of current rise to a steady level of torque corresponding to the substantially constant torque portion of the static torque curve which prevails during the progression of pole overlap following the initial rise in the static torque curve at the commencement of pole overlap. Current in phase A is then similarly ramped down towards the end of this constant torque region, commencing at the point where current for phase B begins its controlled rise. Thus the current magnitude remains substantially constant during an intermediate portion of the angular increment of rotor rotation during which each winding is energised. The initial and terminal portions of the increment of energisation have respectively, rising current magnitudes and falling current magnitudes, and, as shown in the Figure, the rate of increase of current during the initial portion of the angular increment of rotor rotation is the same as the rate of decline of current during the terminal portion. Appropriate selection of the intersections between these current curves will yield substantially ripple-free overall motor torque without the impulsive forces caused by the sharply rising initial parts of the static torque characteristics. The phase torques in operation of the motor then consist of a succession of those portions of the individual static torque characteristics resulting from energisation of the individual phase windings at appropriate stages. The net motor torque during each transition between phases is computed by adding the individual phase torques during the transition. The waveforms required for the strategy of FIG. 5 may be derived by computation or experiment and constructed in operation by a system in accordance with FIG. 1, for example by an appropriate analogue construction of the generator 27.

However such ramped currents are not necessarily easily synthesised in an economical construction by current-regulating means, such as an analogue embodiment of the generator, especially at high rotational speeds, and in addition, phase to phase torque transitions may not necessarily be smoothed for each successive transition by similar ramps, in that the precise shapes of the static torques in the transition regions are to an extent affected by the polarities of the poles between which the transitions take place and are not necessarily identical for each such transition. Accordingly individual analogue ramp generators may require to be specifically tailored for each phase to phase transition. In addition, it will be evident from FIG. 5 that since a proportion of the potential torque-generating capacity of each phase is not fully utilised or is not utilised at all, there is an effective derating of the machine, which while not unacceptable in many applications, is preferably avoided. In an alternative strategy, therefore, the shape of the static torque against rotor angle characteristic is modified to ease the rate of torque rise at the beginning of pole overlap, thus allowing phase currents to be switched during the initial commencement of pole overlap but without the current regulating means having to take account of the abrupt changes in torque experienced at this stage of overlap with characteristics such as those shown in FIG. 5.

Figure 6:
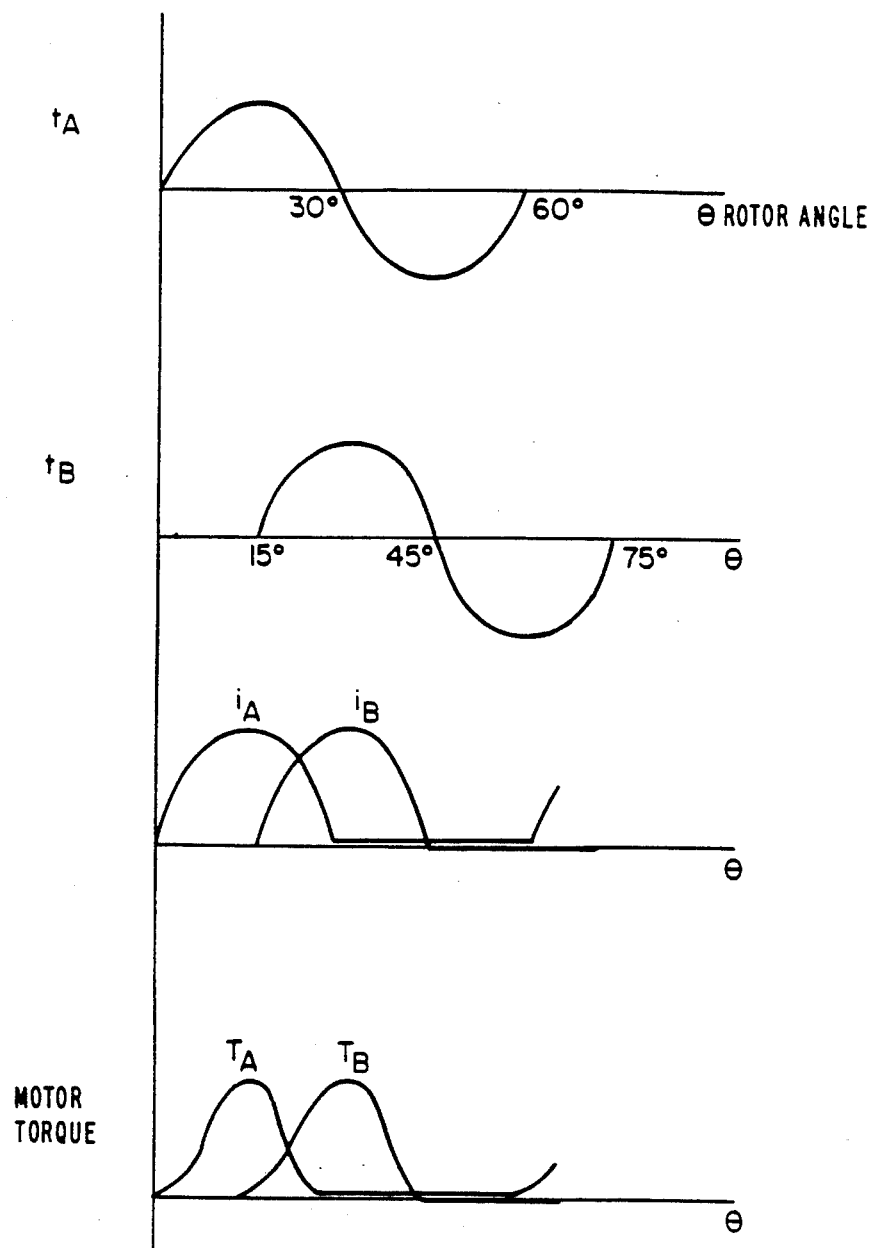
FIG. 6 is a diagram similar to FIG. 5 showing sinusoidal static torque versus rotor angle characteristics and the use of sinusoidal current waveforms, this representing an alternative motor control strategy.

In the alternative strategy illustrated for a four phase machine in FIG. 6, the static torques (t) for phases A and B are modified so that they are substantially sinusoidal by techniques described in a co-pending Application, and each phase is driven with a complementary sinusoidal exciting current (i). Accordingly the motor phase torques (T) under operating conditions are then sine squared curves, which may be shown graphically by plotting static torque curves for different levels of phase current and transferring the appropriate torque values corresponding to the current in each phase at successive angular positions of the rotor onto the motor torque diagram to define the phase torques in operation. Considered in mathematical terms the static torques $t_A$, $t_B$ etc. may be described by $t_A = K_t \cdot I \cdot Sin(\theta)$ and
$t_B = K_t \cdot I \cdot Sin(\theta + 90°) = K_t \cdot I \cdot Cos(\theta)$ etc.
where $K_t$ is a motor constant, so that for phase currents $i_A$ and $i_B$, where $$i_A = I_p \cdot Sin(\theta) \text{ and } i_B = I_p \cdot Cos(\theta), \text{ etc.}$$

$I_p$ being the peak current, the phase torques ($T_A$, $T_B$, etc.) in operation of the motor will be $$T_A = K_r I_p \cdot Sin^2(\theta) \text{ and } T_B = K_r I_p \cdot Cos^2(\theta), \text{ etc.}$$

Thus the 90° phase displacement between phase A and phase B as shown in FIG. 6 means that if the phase torque in operation of the motor for phase A is proportional to sine squared, then that for phase B is proportional to cosine squared. Assuming operation in the saturated region and similar magnetic circuit conditions for each phase, the torque exerted by the motor during transition between phases will then remain constant, since the sum of the squares of the sine and cosine of the same angle equates to unity. This strategy is favoured over the supply of trapezoidal waveforms in that sinusoidal waveshapes have slower rates of change than do step or trapezoidal waveforms at their abrupt transition points, and sharp changes of torque may therefore be avoided. In addition to this a machine having a skewed rotor and fed with corresponding sinusoidal energising currents is significantly quieter than known machines of traditional construction, while since current is applied to the windings only when it is capable of doing useful work by developing torque, and also at all times when it so capable, there is better copper utilisation than in a machine with conventional poles, as well as reduced copper losses.

FIGS. 5 and 6 thus show alternative control strategies achievable by systems in accordance with FIGS. 1 to 4. In FIG. 5, a uniformly rising current prevails during an initial portion of each increment of angular rotation of the rotor of the motor and this is followed by a portion during which the phase current is uniform. The angular increment of energisation terminates with a falling current portion, during which the rate of decay of current is substantially the same as its rate of increase in the initial portion of the angular increment of rotor rotation. Accordingly the energisation configuration of the phase is substantially symmetrical with regard to the angular rotation of the rotor. The exact rates of rise and fall of current required to establish desired phase torques in each phase for smooth torque transitions between phases and a smooth motor torque may be determined by suitable test methods such as that described hereinafter. More complex current waveshapes, in which the rates of rise and fall of current are not necessarily identical, or in which the current profile during the intermediate portion of the angular increment of rotor rotation between the initial and terminal portions is not necessarily uniform, may also be established by such methods.

FIG. 6 shows sinusoidal waveshapes which may be input to the motor by a control system according to the invention as pure sine waves without any additional shaping. Alternatively initially sinusoidal waveforms may be suitably tailored as required to suit a particular motor by said test methods.

The relative magnitudes of the energising phase currents during each period of phase energisation are substantially established by waveshapes of the kind illustrated in FIGS. 5 and 6. The overall or absolute current magnitude is then established in conformity with this pattern of energisation in response to the set level or other control input to the system as well as by the feedback signals provided by the motor itself during operation.

The method according to the invention of establishing operating parameter relationships for a saturable variable reluctance motor will now be described having regard to FIG. 7.

Figure 7:
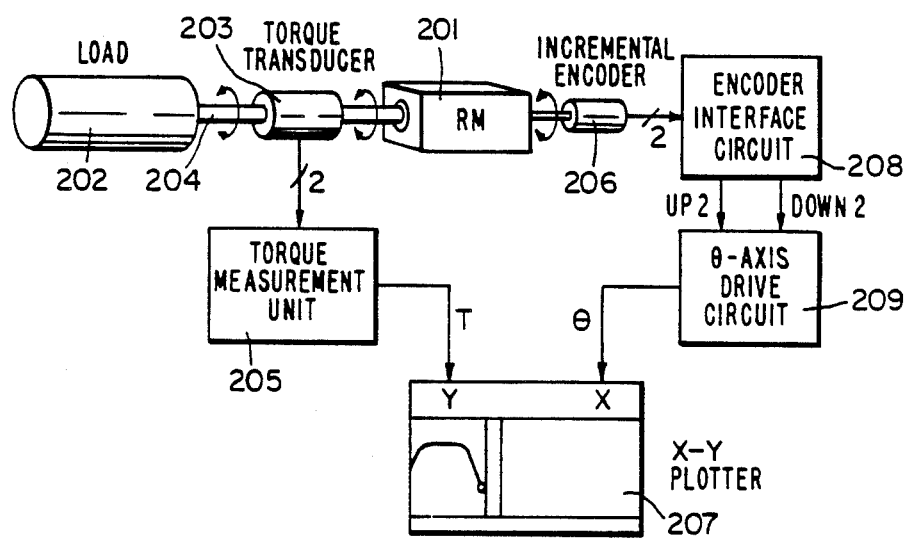
FIG. 7 shows a system for plotting reluctance motor static torque against machine rotor angle.

As shown in FIG. 7, a motor 201 is coupled to a load 202 and a strain gauge transducer 203 is mounted on the shaft 204 connecting the motor and load. The transducer 203 is linked via a rotary transformer (not shown) to a measurement and display unit 205, suitable for the display of measured torque and equipped with an analogue output terminal at which a voltage proportional to torque is available. An incremental encoder 206 or other suitable sensor mounted on the free end of the shaft 205 at the other side of the motor from the load is coupled to an analogue X-Y plotter 207 through an encoder interface circuit 208 and a rotor angle $\theta$-axis drive circuit 209, which operate in the manner described below. A further input to the X-Y plotter is provided by the torque-analogous voltage output of the unit 205.

To produce the torque plots, the torque-analogous output of the torque measurement unit 205 is fed to the Y-axis input of the plotter while the X-axis input is fed a voltage proportional to shaft position.

The rotor angle $\theta$-axis drive circuit 209 produces an analogue voltage proportional to shaft angle by counting encoder clocks and converting the integrated count to an analogue voltage, using a Digital-to-Analogue converter (DAC). The circuit consists of two sections:
(1) a modulo-720 binary up/down counter
(2) a 10-bit DAC circuit The counter counts modulo-720, hence each counter output word corresponds to one of the 720 angular shaft positions possible with a 0.5° clock signal. A counter circuit based around a CMOS 40193 4-bit synchronous up/down binary counter i.c. may be used. This has separate UP and DOWN clock inputs as well as synchronous parallel-load and master-reset inputs. Detection of the counter reaching the two end-points is as follows:
(i) When the counter reaches 720 counting up (i.e. 2D0 hex or 1011010000 binary), it is reset to zero by suitable I.C. gates. A manual reset facility may also be provided.
(ii) When the counter reaches zero counting down, it is preset to 719 (i.e. 2CF hex or 1011001111 binary) on the next down-clock pulse. This may be done by detecting the occurrence of 1023 (3FF hex, 1111111111 binary), which is the next code following zero counting down, and immediately parallel-loading the counter with the value given by the parallel-load inputs, i.e. 719, using suitable integrated circuits.

The 10-bit output counter word may be fed directly to a multiplying DAC to produce for example an output voltage $$V_{OUT} = V_{REF} \frac{N}{1024}$$

where N is the decimal equivalent of the binary input in the case of a particular DAC.

This torque plotting system allows torque to be measured and plotted to a positional resolution of 0.5°. It may be used to produce torque plots for a variable reluctance machine such as the machine forming the subject of one aspect of our co-pending patent application Ser. No. 789,038 entitled "Variable Speed Variable Reluctance Electrical Machines", under d.c. conditions. There are two types of torque curve that can be produced.

Torque/angle curves are those in which static torque for a phase is plotted as a function of angular displacement from the maximum reluctance point of phase one, with d.c. phase current as a parameter. To produce these torque/angle curves, a long bar may be attached to the coupling between the load 202 and the torque transducer 203, the output of which is fed to the Y (vertical) input of the XY plotter 207. Using the bar, the shaft is turned, by hand, through the desired angular distance, while a constant current flows in the phase under test. The plotter's X (horizontal) input is driven from the rotor angle θ-axis drive circuit, which produces a voltage proportional to rotor angular position.

The second type of curve is the torque/current curve, in which static torque for a phase is plotted as a function of phase current, with angular displacement from the origin as a fixed parameter. To produce these curves, the rotor is locked in the desired angular position. Direct current is then supplied to the phase under test via a variable resistor and a current shunt. The voltage developed across the current shunt terminals by the phase current is used to drive the X-axis of the XY plotter, while torque is measured on the vertical Y-axis, as before. The variable resistor is used to increase current linearly, thus producing a torque/current curve for one angular position.

We claim:

1. A control system for a variable reluctance electrical motor having a driving member and a driven member displacable relative to the driving member, said driving member having a plurality of poles and each of said plurality of poles having a winding, the control system comprising
   (a) power supply means,
   (b) driven member position-sensing means, and
   (c) means for producing a demand signal indicative of a desired level of a parameter of motor performance;
   said driven member position-sensing means generating at least one signal having an instantaneous value providing an instantaneous indication of driven member position relative to an origin position for each of a multiplicity of successive positions of the driven member relative to the driving member;
   the power supply system including voltage source means and current regulating means;
   said current regulating means being responsive to said at least one driven member position-sensing means signal to connect said driving member pole windings across said voltage source means in a predetermined sequence during displacement of the driven member and to connect each of said driving member pole winnings across said voltage source means for unidirectional current flow therethrough for a predetermined increment of driven member displacement, said predetermined increment of driven member displacement corresponding to a displacement of the driven member relative to the driving member between a position of maximum reluctance for at least one driven member pole and a cooperating driving member pole and an aligned position of minimum reluctance of said at least one driven member pole and said cooperating driving member pole and comprising a plurality of said multiplicity of successive positions of the driven member relative to the driving member;
   said current-regulating means including means for generating a relative current magnitude signal and means for forcing current in a driving pole winding connected to said voltage source means to track said relative current magnitude signal;
   said means for generating a relative current magnitude signal being responsive to said at least one driven member position-sensing means signal to generate an instantaneous value of said relative current magnitude signal for each of said plurality of said multiplicity of successive positions of the driven member within said predetermined increment of driven member displacement;
   and said current-forcing means being responsive to both said relative current magnitude signal and to said demand signal;
   said current-forcing means being responsive to said relative current magnitude signal to regulate the instantaneous magnitude of said current in a driving member pole winding connected to said voltage source means so that the instantaneous value of said current at any one of said plurality of said multiplicity of successive positions of the driven member within said predetermined increment of driven member displacement relative to its value at any other of said plurality of said multiplicity of successive positions is substantially determined by said instantaneous value of said current magnitude signal corresponding to the instantaneous position of the driven member within said predetermined increment;
   and said current-forcing means being responsive to said demand signal to regulate the instantaneous magnitude of said current so that the absolute value of said current at each of said plurality of said multiplicity of successive positions of the driven member within said predetermined increment of driven member displacement is substantially determined by the value of said demand signal.

2. A control system for a variable reluctance electrical motor having a stator, and a rotor rotatable relative to the stator, said stator having a plurality of poles and each of said plurality of poles having a winding, the control system comprising
   (a) power supply means,
   (b) rotor position-sensing means, and
   (c) means for producing a demand signal indicative of a desired level of a parameter of motor performance;
   said rotor position-sensing means generating at least one signal having an instantaneous value providing an instantaneous indication of rotor position relative to an origin position for each of a multiplicity of successive angular positions of the rotor relative to the stator; the power supply system including voltage source means and current regulating means;
   said current regulating means being responsive to said at least one rotor position-sensing means signal to connect said stator pole windings across said voltage source means in a predetermined sequence during rotation of the rotor and to connect each of said stator pole winnings across said voltage source means for unidirectional current flow therethrough for a predetermined angular increment of rotor rotation, said predetermined angular increment of rotor rotation corresponding to a displacement of the rotor relative to the stator between a position of maximum reluctance for at least one rotor pole and a cooperating stator pole and an aligned position of minimum reluctance of said at least one rotor pole and said cooperating stator pole and comprising a plurality of said multiplicity of successive angular positions of the rotor relative to the stator;

said current-regulating means including means for generating a relative current magnitude signal and means for forcing current in a stator pole winding connected to said voltage source means to track said relative current magnitude signal;

said means for generating a relative current magnitude signal being responsive to said at least one rotor position-sensing means signal to generate an instantaneous value of said relative current magnitude signal for each of said plurality of said multiplicity of successive angular positions of the rotor within said predetermined angular increment of rotor rotation; and said current-forcing means being responsive to both said relative current magnitude signal and to said demand signal;

said current-forcing means being responsive to said relative current magnitude signal to regulate the instantaneous magnitude of said current in a driving pole winning connected to said voltage source means so that the instantaneous value of said current at any one of said plurality of said multiplicity of successive angular positions of the rotor within said predetermined angular increment of rotor rotation relative to its value at any other of said plurality of said multiplicity of successive angular positions is substantially determined by said instantaneous value of said current magnitude signal corresponding to the instantaneous angular position of the rotor within said predetermined angular increment;

and said current-forcing means being responsive to said demand signal to regulate the instantaneous magnitude of said current so that the absolute value of said current at each of said plurality of said multiplicity of successive angular positions of the rotor within said predetermined angular increment of rotor rotation is substantially determined by the value of said demand signal.

3. A control system according to claim 2, wherein said predetermined increment of rotor rotation has an initial portion comprising a first plurality of said multiplicity of successive angular positions of the rotor relative to the stator and a terminal portion comprising a second plurality of said multiplicity of successive angular positions of the rotor relative to the stator, said means for generating a relative current magnitude signal is responsive to said at least one rotor position-sensing means signal to generate an instantaneous value of said relative current magnitude signal for each of said first plurality of said multiplicity of successive angular positions of the rotor during said initial portion of said predetermined angular increment of rotor rotation, the succession of said instantaneous values of said relative current magnitude signal being adapted to cause said current forcing means to regulate the instantaneous magnitude of said current in a stator pole winding connected to said voltage source means so that successive instantaneous relative values of said current during said initial portion of said predetermined angular increment of rotor rotation increase progressively with progressive rotation of the rotor, and said means for generating a relative current magnitude signal is responsive to said at least one rotor position-sensing means signal to generate an instantaneous value of said relative current magnitude signal for each of said second plurality of said multiplicity of successive angular positions of the rotor during said terminal portion of said predetermined angular increment of rotor rotation, the succession of said instantaneous values of said relative current magnitude signal being adapted to cause said current-forcing means to regulate the instantaneous magnitude of said current in a stator pole winding connected to said voltage source means so that successive instantaneous relative values of said current during said terminal portion of said predetermined angular increment of rotor rotation decrease progressively with progressive rotation of the rotor.

4. A control system according to claim 3, wherein said succession of said instantaneous values of said relative current magnitude signal for said first plurality of said multiplicity of successive angular positions of the rotor during said initial portion of said predetermined angular increment of rotor rotation and said succession of said instantaneous values of said relative current magnitude signal for said second plurality of said multiplicity of successive angular positions of the rotor during said terminal portion of said predetermined angular increment of rotor rotation are adapted to cause said current-forcing means to regulate the instantaneous magnitude of said current in a stator pole winding connected to said voltage source means so that the rate at which successive instantaneous relative values of said current decreases during said terminal portion of said predetermined angular increment of rotor rotation is substantially the same as the rate of increase of successive instantaneous relative values of said current during said initial portion of said predetermined angular increment of rotor rotation and the succession of instantaneous relative values of said current over said predetermined angular increment of rotor rotation substantially defines a substantially symmetrical current waveshape extending over said predetermined angular increment of rotor rotation.

5. A control system according to claim 3, wherein said succession of said instantaneous values of said relative current magnitude signal for said first plurality of said multiplicity of successive angular positions of the rotor during said initial portion of said predetermined angular increment of rotor rotation and said succession of said instantaneous values of said relative current magnitude signal for said second plurality of said multiplicity of successive angular positions of the rotor during said terminal portion of said predetermined angular increment of rotor rotation are adapted to cause said current-forcing means to regulate the instantaneous magnitude of said current in a stator pole winning connected to said voltage source means so that successive instantaneous relative values of said current during said initial portion of said predetermined angular increment of rotor rotation substantially define the rising current region of a substantially sinusoidal current halfwave and successive instantaneous relative values of said current during said terminal portion of said predetermined angular increment of the rotation substantially define the falling current region of a substantially sinusoidal current halfwave.

6. A control system according to claim 5, wherein said predetermined increment of rotor rotation has an intermediate portion comprising a third plurality of said multiplicity of successive angular positions of the rotor relative to the stator, said intermediate portion following said initial portion and ending with the commencement of said terminal portion, said means for generating a relative current magnitude signal is responsive to said at least one rotor position-sensing means signal to generate an instantaneous value of said relative current magnitude signal for each of said third plurality of said multiplicity of successive angular positions of the rotor during said intermediate portion of said predetermined angular increment of rotor rotation, and the succession of said instantaneous values of said relative current magnitude signal is adapted to cause said current-forcing means to regulate the instantaneous magnitude of said current so that successive instantaneous relative values of said current in a stator pole winding connected to said voltage source means remain substantially constant during said intermediate portion of said predetermined angular increment of rotor rotation.

7. A control system according to claim 3, wherein said succession of said instantaneous values of said relative current magnitude signal for said first plurality of said multiplicity of successive angular positions of the rotor during said initial portion of said predetermined angular increment of rotor rotation and said succession of said instantaneous values of said relative current magnitude signal for said second plurality of said multiplicity of successive angular positions of the rotor during said terminal portion of said predetermined angular increment of rotor rotation are adapted to cause said current-forcing means to regulate the instantaneous magnitude of said current in a stator pole winding connected to said voltage source means so that the succession of said instantaneous relative values of said current during said predetermined angular increment of rotor rotation substantially define a substantially sinusoidal halfwave.

* * * * *